United States Patent
Bourassa-Denis et al.

(10) Patent No.: US 10,805,386 B2
(45) Date of Patent: Oct. 13, 2020

(54) REDUCING TRANSMISSIONS BY SUGGESTING DIGITAL CONTENT FOR DISPLAY IN A GROUP-BASED COMMUNICATION INTERFACE

(71) Applicant: SLACK TECHNOLOGIES, INC., San Francisco, CA (US)

(72) Inventors: Renaud Bourassa-Denis, New York, NY (US); Jerry Talton, New York, NY (US); Jenna Zeigen, Brooklyn, NY (US); Michael Montazeri, Brooklyn, NY (US); Noah Weiss, New York, NY (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/514,821

(22) Filed: Jul. 17, 2019

(65) Prior Publication Data

US 2020/0036783 A1 Jan. 30, 2020

Related U.S. Application Data

(60) Provisional application No. 62/703,079, filed on Jul. 25, 2018.

(51) Int. Cl.
| | |
|---|---|
| *H04L 29/08* | (2006.01) |
| *G06F 16/903* | (2019.01) |
| *H04L 12/58* | (2006.01) |
| *G06F 16/951* | (2019.01) |
| *G06F 16/9035* | (2019.01) |

(52) U.S. Cl.
CPC ...... *H04L 67/1044* (2013.01); *G06F 16/9035* (2019.01); *G06F 16/90335* (2019.01); *G06F 16/951* (2019.01); *H04L 51/046* (2013.01)

(58) Field of Classification Search
CPC ... H04L 67/1044; H04L 51/046; H04L 51/22; H04L 51/18; G06F 16/951; G06F 16/90335; G06F 16/9035; G06F 16/9038; H04W 4/08; H04W 4/12
USPC .......................................................... 709/204
See application file for complete search history.

(56) References Cited

U.S. PATENT DOCUMENTS

| | | | |
|---|---|---|---|
| 9,088,559 B2 | 7/2015 | Ma et al. | |
| 9,100,355 B2 | 8/2015 | Tomkow | |
| 9,160,550 B1 | 10/2015 | Morrison et al. | |
| 9,940,394 B1 | 4/2018 | Grant et al. | |
| 2015/0128014 A1* | 5/2015 | Monroe | G06F 3/0482 715/202 |
| 2017/0046374 A1 | 2/2017 | Fletcher et al. | |
| 2017/0048170 A1* | 2/2017 | Smullen | H04L 67/306 |

(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Tu T Nguyen
(74) *Attorney, Agent, or Firm* — Lee & Hayes, P.C.

(57) ABSTRACT

Provided is a group-based communication interface and an apparatus configured to programmatically generate and provide digests of relevant group-based communications transmitted between a plurality of client devices and a group-based communication system.

23 Claims, 6 Drawing Sheets

(56) References Cited

U.S. PATENT DOCUMENTS

| | | | |
|---|---|---|---|
| 2017/0228253 | A1 | 8/2017 | Layman et al. |
| 2018/0157468 | A1 | 6/2018 | Stachura |
| 2018/0212904 | A1* | 7/2018 | Smullen .................. H04L 51/04 |
| 2018/0287982 | A1 | 10/2018 | Draeger et al. |
| 2019/0200177 | A1 | 6/2019 | Greene et al. |

OTHER PUBLICATIONS

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-ald9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, AT FP10, Lexisnexis, https://advance.lexis.com/api/permalink/96268e3f-26ad-48ac-a98f-6c39804ebded/?context=1000516, (dated Mar. 4, 2014) 2 pages.A Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

U.S. Appl. No. 15/604,584, filed May 24, 2017, In re: Grant et al. entitled Messaging Search and Management Apparatuses, Methods and Systems, 139 pages.

U.S. Appl. No. 15/604,589, filed May 24, 2017, In re: Grant et al. entitled Messaging Search and Management Apparatuses, Methods and Systems, 139 pages.

* cited by examiner

REDUCING TRANSMISSIONS BY SUGGESTING DIGITAL CONTENT FOR DISPLAY IN A GROUP-BASED COMMUNICATION INTERFACE

This patent application claims priority to U.S. Provisional Appl. Ser. No. 62/703,079, titled "REDUCING TRANSMISSIONS BY SUGGESTING DIGITAL CONTENT FOR DISPLAY IN A GROUP-BASED COMMUNICATION INTERFACE," filed Jul. 25, 2018, the contents of which are incorporated herein by reference in their entirety.

BACKGROUND

Various messaging systems are available that allow users to have continuous conversations electronically between each other. In such systems, one or more users may send messages back and forth discussing various topics. In certain systems, the string of messages may be saved and later accessible to the participants of the conversation. The volume of conversational messages may be overwhelming to a reader. Furthermore, important content in the messages may generally get ignored, and are not effectively provided to a user. There is, therefore, a need for systems and methods that provide contextual summaries from said conversational messages based on a user's role, interest, and/or interactions, as well as provide suggested conversational messages that may be important and/or relevant to the user.

Applicant has identified a number of deficiencies and problems associated with conventional messaging systems. Through applied effort, ingenuity, and innovation, many of these identified problems have been solved by developing solutions that are included in embodiments of the present invention, many examples of which are described in detail herein.

BRIEF SUMMARY

In general, embodiments of the present invention provided herein include methods, apparatus, and computer program products for intelligently analyzing group-based communication channels to curate a digest of relevant group-based messaging communications in a group-based communication platform.

For example, the methods, apparatuses, and computer program product may be configured to receive a user identifier, wherein the use identifier is associated with group-based messaging communications transmitted to one or more of a plurality of group-based communication channels. Further embodiments of the methods, apparatuses, and computer program product comprise extracting one or more topics from the group-based messaging communications. In an example embodiment, methods, apparatuses, and computer program product are configured for generating queries to a messaging communication knowledge domain to locate conceptually related group-based messaging communications associated with the one or more topics. Furthermore, methods, apparatuses, and computer program product are configured to select the conceptually related group-based messaging communications to be presented based on one or more parameters, aggregate the group-based messaging communications into an electronic group-based communication digest, and cause to transmit the electronic group-based communication digest to a user device associated with the user identifier.

BRIEF DESCRIPTION OF THE FIGURES

Reference will now be made to the accompanying drawings, which are not necessarily drawn to scale, and wherein.

DETAILED DESCRIPTION

Figure 1:
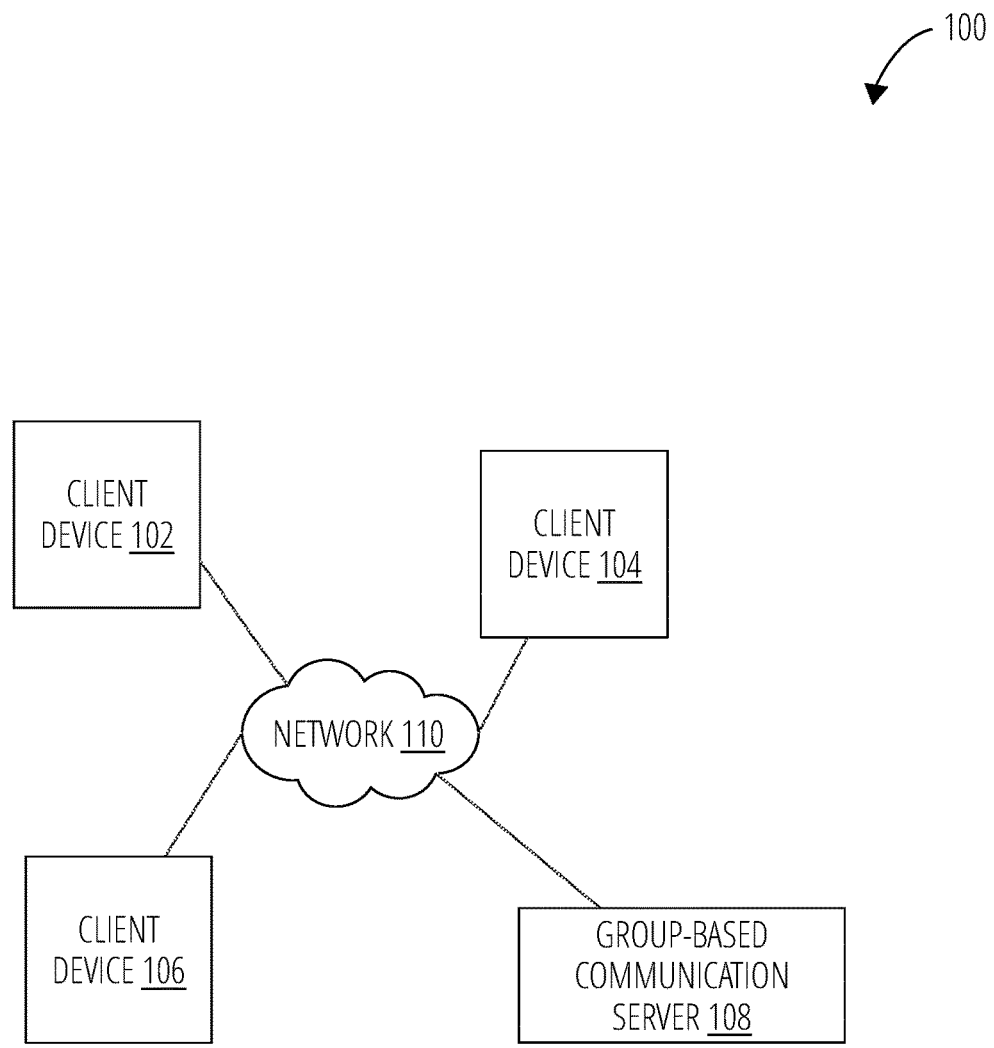
FIG. 1 illustrates an example system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

As used herein, the term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different users of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message transmitted or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are transmitted by a particular user (i.e., a client device associated with the particular user) intended for posting within a group-based communication system (defined below). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

A "receiver channel" refers to a group-based communication channel that is linked to a graphical identifier. In response to the graphical identifier being associated with (e.g., tagged to) a selected messaging communication of a selected group-based communication channel, a channeled copy of the selected messaging communication is stored in the receiver channel. Notably, the receiver channel is different from the selected group-based communication channel that originated the selected messaging communication and can be accessed separately from the selected group-based communication channel (e.g., without first accessing the selected group-based communication channel).

As used herein, "channeled copy" refers to a copy or duplicate of a messaging communication that includes messaging communication information and is stored for display within a receiver channel. "Messaging communication information" refers to any information associated with the messaging communication, such as information related to the user who created the messaging communication, the group-based communication channel on which the messaging communication was first provided (e.g., the name of the group-based communication channel), the time and date that the messaging communication was first provided, subsequent reproductions of the messaging communication (e.g., date, time, name of the receiver channel, etc. of such reproduction), and any other identifying information related to the messaging communication.

As used herein, the term "graphical identifier" refers to any visual icon, avatar, image, video, photo, or graphic that may be used to label, tag, or otherwise distinguish a selected messaging communication. In some embodiments, the graphical identifier may provide a visual illustration of a sentiment or emotion that a user may wish to associate with a selected messaging communication. For instance, the graphical identifier may be an emoji or an emoticon or other similar expressive visual identification means. In some embodiments, the graphical identifier may be animated, such as to illustrate movement between a first state and a second state when displayed within the selected group-based communication interface. For instance, the graphical identifier may be a series of images of a gavel that when run in sequence illustrate the movement of a gavel knocking against a desk. The animated gavel may then be used in messaging communications that include final decisions as an indicator that such a decision was made.

As used herein, "channeling association" in the context of a graphical identifier and a receiver channel refers to the relationship or correlation of the graphical identifier to the receiver channel. A user can establish a channeling association between a graphical identifier and a receiver channel, cancel a channeling association between a graphical identifier and a receiver channel, and re-establish a channeling association between a graphical identifier and a receiver channel. When re-establishing a channeling association, the group-based communication interface may only associate the respective graphical identifier with the applicable receiver channel for future correlation indications. The channeling association may be made using a variety of user commands such as that depicted below:

As used herein, "correlation indication" refers to the instructions or signals received that indicate the messaging communication has been tied to a graphic identifier.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., j doe), a password, a real name, a time zone, a status, user interest indicators, and the like. The user account details can include a subset designation of user credentials, such as, for example, login information for the user including the user's username and password. For example, and without limitation, a user identifier may include a unique graphical identifier (e.g., an avatar), an IP address, a MAC address, and the like.

The term "diversified subset" in this context refers to diverse content rather than content highly individualized or channel-based. Thus, a diversified subset of dynamic content modules provides de-individualized content that covers a broad range of content from different viewpoints.

The term "electronic group-based communication digest" in this context refers to a collection of concise but detailed summary of information about a particular group-based communication channel, topic, and/or user identifier. The electronic group-based communication digest includes a summary of the most important group-based messaging communications currently taking place or took place on a group-based communication system. The summaries may be transmitted, in real-time, from the server to the client device, and rendered, in real-time, by the group-based communication interface. The electronic group-based communication digest comprises group-based messaging communications retrieved from a messaging communications database and/or a messaging communication knowledge domain responsive to a query within the group-based communication system. For example, a package or bundle of group-based communication channels, specific users, and a specific set of topics related to employee on-boarding may be packaged or bundled together in an electronic group-based communication digest for a new employee to review.

The term "digest search bundle" in this context refers to a list or bundle of topics or phrases searched for through a plurality of group-based messaging communications in which matches are selected according to relevancy to a user and further refined according to one or more parameters. The digest search bundle includes text-based topics or phrases, image-based topics or phrases, video-based topics or phrases, audio-based topics or phrases, and/or user-based topics or phrases. For example, an image of the Eiffel tower in Paris may contain a plurality of image descriptors for incorporation into a digest search bundle. Said digest search bundles are used to retrieve conceptually related group-based messaging communications and/or suggest topics, users, or group-based communication channels to a user. The suggested topics, users, or group-based communication channels are determined based on the likelihood that the user will follow the suggestion and/or a measure of importance of content on the group-based communication system.

The term "messaging communication knowledge domain" in this context refers to an area of knowledge or a collection of information pertaining to a particular subject such as information technology, human resources, marketing, business, medical, industrial, entertainment, news, legal, financial, food, travel, or sports, to name just a few. The messaging communication knowledge domain can refer to data of any subject matter. Ontology based on the messaging communication knowledge domain may be used to enhance query and analysis to retrieve conceptually related group-messaging communications. For example, after a digest search bundle is received, a domain-specific enrichment of the query using ontology may be performed so as to add or eliminate topics or phrases that do not fit domain-specific criteria. For example, in the information technology domain, a group-based messaging communication discussing scripts to setup a project workspace may be more relevant to the user than a group-based messaging communication that only discusses a generic project workspace setup.

The term "user interest indicators" refers to one or more items of data that indicate user-associated trends, user behavior, or user reactions, or which may be modeled by a group-based communication system to predict or suggest future user behavior within a group-based communication interface. User interest indicators include all signals of engagement by a user with a group-based communication interface including, without limitation, message communications and message communication information, user profile associated information, direct messages and direct message information, client device reported location data, mouse-over data, click data, channel engagement data, and the like. Such interest indicators could include a popular discussion topics indicator that indicates popular discussion topics in a user's message communications or direct messages, a user's group-based communication channel access counts, group-based communication channel member discussion frequency indicator that indicates the frequency by which the user interacts with the members of a group-based communication channel, a popular direct message recipients indicator that indicates users that the user most frequently sends a direct message to, a user status value (e.g., a user's role or status within an organization), a user's preferred contacts indicator that indicates preferred users (i.e., wife, kids, parents related to the user or other individuals that the user has indicated as preferred), and a user application reaction indicator that indicates a user's interaction with applications installed in one or more group-based communication channels. User interest indicators may also be determined from aggregated data of other users, perhaps deemed similar to a user of interest (e.g., similar role within a group or enterprise, similar age, gender, etc.), stored to the group-based communication repository. Based on these user interest indicators, message communications, suggested topics, users, channels, and the like may be determined that are relevant or of particular interest to a user.

The term "relevance score" refers to the output of ranking model or algorithm such as a co-ranking model, a statistical model, a machine learning model, a trainable classifier, a supervised learning model, and the like, which indicates the relevance of a group-based messaging communication to a user based on attributes of the message communication (e.g., metadata, urgent message indicator, timing, etc.) and attributes of the user (i.e., user profile associated data, client device location, etc.). In one embodiment, the relevance score is used to determine which of the one or more messages to include in the electronic group-based communication digest within a group-based communication interface.

Overview

Discussed herein methods, apparatus, systems, computing devices, computing entities, and/or the like for a group-based content suggestion system for generating and/or transmitting digests of relevant group-based communications to various devices/entities associated with a user to provide a reduced collection of concise but detailed summaries of information.

Each client device of a group-based communication channel is typically associated with a plurality of group-based communication channels. Each group-based communication channel receives potentially a flurry of message communications on a daily basis. These message communications can contain extensive data, resulting in the transfer of large amounts of data, even potentially redundant data. The data transfers require data storage (i.e., memory on the client device), transmission bandwidth, processing power (i.e., retrieval and conversion to appropriate packets for transmission by a server to the client device), and time.

Accordingly, the present disclosure provides a technological improvement that results in minimizing the amount of data transmitted to and from devices and computing entities within a group-based communication system, while also ensuring the most important and/or relevant data is prioritized for consumption in an interface. In certain embodiments, one or more electronic group-based communication digests may be generated via a group-based content suggestion system specifically customized to a user of the client device's preferences and optimized for download and storage to the local memory of the client device. Additionally, when downloading the electronic group-based communication digest, over, for example, a restricted bandwidth network, download times can be minimal due to the reduced volume of data. Thus, the group-based content suggestion system of the present disclosure provides savings in memory, transmission/network bandwidth, processing power, and time.

Exemplary Architecture & Apparatuses

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. For example, system 100 may include group-based communication group-based communication server 108, which can include, for example, the circuitry disclosed in FIGS. 2 and 3, a server, or database, among other things (not shown). The group-based communication group-based communication server 108 may include any suitable network server and/or other type of processing device. In some embodiments, the group-based communication group-based communication server 108 may determine and transmit commands and instructions for rendering an electronic group-based communication digest to client devices 102-106 using data from the messaging communications database 210 and the generated queries to a messaging communication knowledge domain to locate conceptually related group-based messaging communications associated with the one or more topics 406.

The messaging communications database 210 may be embodied as a data storage device such as a Network Attached Storage (NAS) device or devices, or as a separate database server or servers. The messaging communications database 210 includes information accessed and stored by the group-based communication group-based communication server 108 to facilitate the operations of the group-based communication system 100. For example, the messaging communications database 210 may include, without limitation, a plurality of messaging communications organized among a plurality of group-based communication channels, and/or the like.

Information about one or more group-based communication channels may be drawn from the messaging communications database 210, and then, in light of the information, one or more queries are generated and used against a messaging communication knowledge domain and/or the messaging communications database 210 to locate conceptually related group-based messaging communications associated with the one or more topics derived from the information in the one or more group-based communication channels. The queries may be altered based on information received from a user input, a user request, a user identifier or the like. For instance, if a user selects a timeframe beginning on January 2018, information occurring prior to January 2018 may be excluded from consideration, and accordingly the generated queries used to locate conceptually related group-based messaging communications associated with the one or more topics may only contain information related to the particular group-based communication channel that occurs on or after January 2018. In some examples, the generated queries used to locate conceptually related group-based messaging communications associated with the one or more topics may describe relationships between various events and/or phenomena in a message or messaging communication. For example, in a group-based communication channel, the generated queries to locate conceptually related group-based messaging communications associated with the one or more topics may indicate conceptually related messages in an instance in which the messages are posted within a predetermined network time of a particular concept. Such messages may be labeled as important and/or conceptually related, whereas messages posted after the predetermined network time may not be marked as important. In some example embodiments, each of the relationships between various events and/or phenomena in the message may be given an importance and/or otherwise may be weighted based on the importance level of the relationship between the various events and/or phenomena in the message.

Group-based communication group-based communication server 108 can communicate with one or more client devices 102-106 via network 110. In this regard, network 110 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 110 may include a cellular telephone, an 802.11, 802.16, 802.20, and/or WiMax network. Further, the network 110 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The group-based communication group-based communication server 108 may provide for receiving of electronic data from various sources, including but not necessarily limited to the client devices 102-106. For example, the group-based communication group-based communication server 108 may be operable to receive and post or transmit group-based messaging communications provided by the client devices 102-106.

Client devices 102-106 and/or group-based communication group-based communication server 108 may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of client devices 102, 104, and 106 is merely for illustration purposes. Any number of users may be included in the system 100 so long as the users have the proper credentials for accessing the selected group-based communication interface. In one embodiment, the client devices 102-106 may be configured to display an interface on a display of the client device for viewing, creating, editing, and/or otherwise interacting with at least one group-based communication channel, which may be provided by the group-based communication group-based communication server 108. According to some embodiments, the group-based communication group-based communication server 108 may be configured to display the interface on a display of the group-based communication group-based communication server 108 for viewing, creating, editing, and/or otherwise interacting with a group-based communication channel. In some embodiments, an interface of a client device 102-106 may be different from an interface of a group-based communication group-based communication server 108. The client devices 102-106 may be used in addition to or instead of the group-based communication group-based communication server 108. System 100 may also include additional client devices and/or servers, among other things. Additionally or alternatively, the client device 102-106 may interact with the group-based communication system 100 via a web browser. As yet another example, the client device 102-106 may include various hardware or firmware designed to interface with the group-based communication system 100.

The client devices 102-106 may be any computing device as defined above. Electronic data received by the group-based communication group-based communication group-based communication server 108 from the client devices 102-106 may be provided in various forms and via various methods. For example, the client devices 102-106 may include desktop computers, laptop computers, smartphones, netbooks, tablet computers, wearables, and the like.

In embodiments where a client device 102-106 is a mobile device, such as a smart phone or tablet, the client device 102-106 may execute an "app" to interact with the group-based communication system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 102-106 may interact with the group-based communication system 100 via a web browser. As yet another example, the client device 102-106 may include various hardware or firmware designed to interface with the group-based communication system 100.

In some embodiments of an exemplary group-based communication system, a message or messaging communication may be sent from a client device 102-106 to a group-based communication group-based communication server 108. In various implementations, the message may be transmitted to the group-based communication system 100 over communications network 110 directly by a client device 102-106, the message may be transmitted to the group-based communication system 100 via an intermediary such as a message server, and/or the like. For example, the client device 102-106 may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 102-106 may provide a message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
```

```xml
        <client_details> //Mac Desktop with Webbrowser
            <client_IP>10.0.0.123</client_IP>
            <user_agent_string>Mozilla/5.0 (Macintosh; Intel Mac OS X 10_9_3)
        AppleWebKit/537.75.14 (KHTML, like Gecko) Version/7.0.3
        Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-
        XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>ID_message_10</message_identifier>
            <team_identifier>ID_team_1</team_identifier>
            <channel_identifier>ID_channel_1</channel_identifier>
            <contents>That is an interesting invention. I have attached a copy our patent
        policy.</contents>
            <attachments>patent_policy.pdf</attachments>
        </message>
</auth_request>
```

The group-based communication system 100 comprises at least one group-based communication group-based communication server 108 that may create a storage message based upon the received message to facilitate message indexing and storage in a messaging communication database. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the server 140 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our
patent policy.</contents>
    <attachments>patent_policy.pdf</attachments>
    <conversation_primitive>
        conversation includes messages: ID_message_8,
        ID_message_9, ID_message_10, ID_message_11,
        ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. Said reaction data may be used to determine or set a user interaction indicator. A user interaction indicator comprises signals of engagement and/or likelihood of engagement by a user with a group-based communication interface including, without limitation, message communications and message communication information, user profile associated information, members of the same or different communication channels, direct messages and direct message information, client device reported location data, mouse-over data, click data, channel engagement data, and the like. In one implementation, data regarding responses to the message by other users may be included with the message, and the message may be parsed (e.g., using PHP commands) to determine the responses. In another implementation, data regarding responses to the message may be retrieved from a database.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from messaging communication database). In one implementation, a storage message may be transmitted from the server to facilitate indexing in the messaging communication database. In another implementation, metadata associated with the message may be determined and the message may be indexed in the messaging communication database. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the messaging communication database to facilitate searching. In one embodiment, the files may be indexed such that a company's or a group's files are indexed at a separate distributed database.

Examples of messaging search and management apparatuses and methods for use with embodiments of the present disclosure are disclosed in U.S. patent application Ser. No. 15/604,584, titled "MESSAGING SEARCH AND MANAGEMENT APPARATUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, and issued as U.S. Pat. No. 9,940,394 on Apr. 10, 2018, the contents of which are incorporated herein by reference in their entirety. The examples include metadata extraction and work graph generation, as well as application of machine learning techniques for use with embodiments of the present disclosure.

Figure 2:
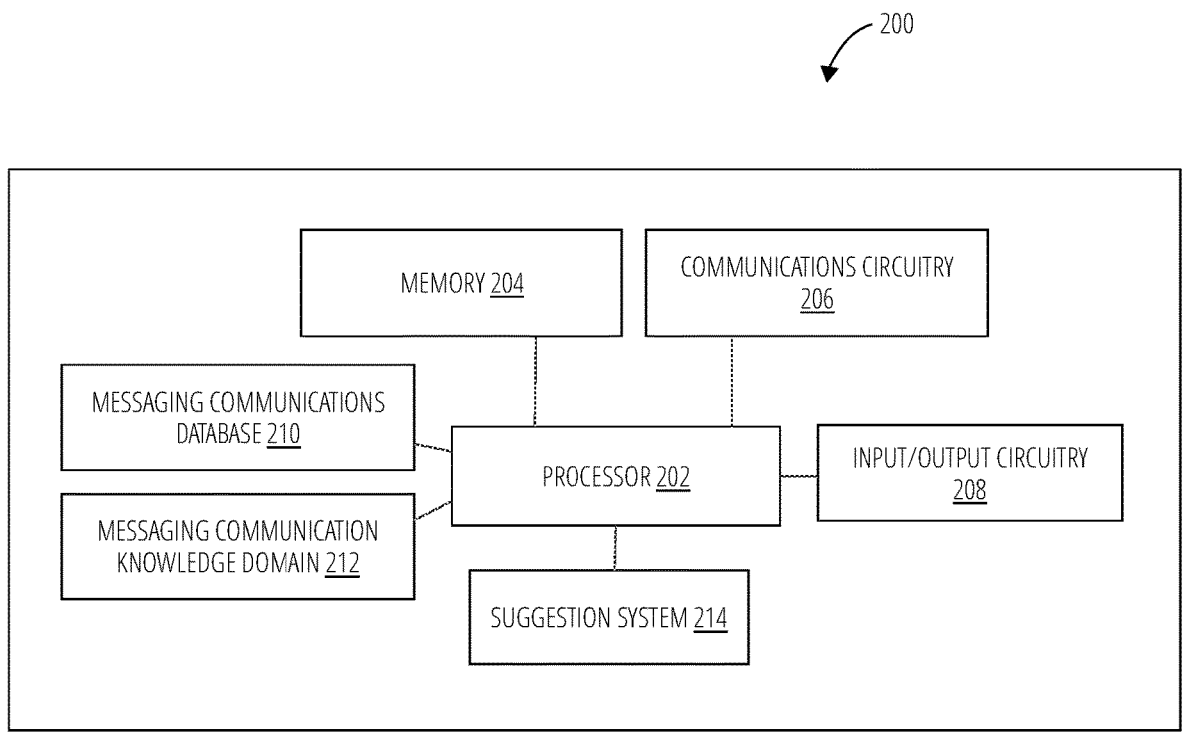
FIG. 2 illustrates a schematic block diagram of circuitry that can be included in a computing device in accordance with some embodiments discussed herein.

FIG. 2 shows a schematic block diagram of circuitry 200, some or all of which may be included in, for example, group-based communication server 108 and/or client devices 102-106. Any of the aforementioned systems or devices may include the circuitry 200 and may be configured to, either independently or jointly with other devices in a network 110 perform the functions of the circuitry 200 described herein. As illustrated in FIG. 2, in accordance with some example embodiments, circuitry 200 can includes various means, such as processor 202, memory 204, communications circuitry 206, and/or input/output circuitry 208. In some embodiments, messaging communications database 210, messaging communication knowledge domain 212 and/or a suggestion system 214 may also or instead be included. As referred to herein, "circuitry" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 202 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 202 is configured to execute instructions stored in memory 204 or otherwise accessible to processor 202. These instructions, when executed by processor 202, may cause circuitry 200 to perform one or more of the functionalities of circuitry 200 as described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. Alternatively, as another example, when processor 202 is embodied as an executor of instructions, such as may be stored in memory 204, the instructions may specifically configure processor 202 to perform one or more algorithms and operations described herein, such as those discussed in connection with FIGS. 1-6.

Communications circuitry 206 may be embodied as any device or means embodied in hardware, a computer program product comprising computer readable program instructions stored on a computer readable medium (e.g., memory 204) and executed by a processing device (e.g., processor 202), or a combination thereof that is configured to receive and/or transmit data from/to another device and/or network, such as, for example, a second circuitry 200 and/or the like. In some embodiments, communications circuitry 206 (like other components discussed herein) can be at least partially embodied as or otherwise controlled by processor 202. In this regard, communications circuitry 206 may be in communication with processor 202, such as via a bus. Communications circuitry 206 may include, for example, an antenna, a transmitter, a receiver, a transceiver, network interface card and/or supporting hardware and/or firmware/software for enabling communications with another computing device. Communications circuitry 206 may be configured to receive and/or transmit any data that may be stored by memory 204 using any protocol that may be used for communications between computing devices. Communications circuitry 206 may additionally or alternatively be in communication with the memory 204, input/output circuitry 208 and/or any other component of circuitry 200, such as via a bus.

Input/output circuitry 208 may be in communication with processor 202 to receive an indication of a user input and/or to provide an audible, visual, mechanical, or other output to a user (e.g., provider and/or consumer). Some example visual outputs that may be provided to a user by circuitry 200 are discussed in connection with FIG. 5. As such, input/output circuitry 208 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output circuitry 208 may be reduced as compared to embodiments where circuitry 200 is implemented as an end-user machine (e.g., consumer device and/or provider device) or other type of device designed for complex user interactions. In some embodiments (like other components discussed herein), input/output circuitry 208 may even be eliminated from circuitry 200. Alternatively, such as in embodiments wherein circuitry 200 is embodied as a server or database, at least some aspects of input/output circuitry 208 may be embodied on an apparatus used by a user that is in communication with circuitry 200. Input/output circuitry 208 may be in communication with the memory 204, communications circuitry 206, and/or any other component(s), such as via a bus. One or more than one input/output circuitry 208 and/or other component can be included in circuitry 200.

Messaging communications database 210, messaging communication knowledge domain 212, and suggestion system 214 may also or instead be included and configured to perform the functionality discussed herein related to generating and/or editing group-based communication channels. In some embodiments, some or all of the functionality of generating and/or editing an electronic group-based communication digest may be performed by processor 202. In this regard, the example processes and algorithms discussed herein can be performed by processor 202 messaging communications database 210, messaging communication knowledge domain 212, and/or suggestion system 214. For example, non-transitory computer readable media can be configured to store firmware, one or more application programs, and/or other software, which include instructions and other computer-readable program code portions that can be executed to control each processor (e.g., processor 202, messaging communications database 210, messaging communication knowledge domain 212, and/or suggestion system 214) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

In some embodiments, a messaging communications database 210 may be provided that includes communications data, user account details, query data, and/or topic data. Communications data includes graphical identifiers data, group-based communication channels data, and/or channeling association data. For instance, channeling associations may be received by the circuitry 200 and stored in the messaging communications database 210 as channeling association data. Similarly, graphical identifiers may be stored in the messaging communications database 210 as graphical identifiers data and data relating to group-based communication channels may be stored in the messaging communications database 210 as group-based communication channels data. User account details, in some embodiments, may include biographical data and/or preference data associated with individual profiles or group profiles. Additionally or alternatively, the messaging communications database 210 may include query data and/or topic data which provides any additional information needed by the suggestion system 214 in analyzing messaging communications, indications, and requests and generating and/or editing electronic group-based communication digests.

In some examples, the suggestion system 214 may be configured to input messaging communication knowledge domain 212 data. The messaging communication knowledge domain 212 may be provided that includes properties that may be predicated of the topics and concepts and the like, relationships that may hold between the topics, concepts, and the like, and representations of any specific knowledge that is required. The messaging communication knowledge domain 212 may contain information related to a particular domain, industry, and/or group-based communication channel. Example domains may include, but are not limited to, information technology, human resources, marketing, business, medical, industrial, entertainment, news, legal, financial and/or the like. In some examples, the messaging communication knowledge domain 212 may classify a message as representative of a category related to the particular domain, in which case the suggestion system 214 may identify whether the message identifies a topic of interest. In addition, the messaging communication knowledge domain 212 is used to weight messages that helps in deciding the relevancy to a concept and/or topic. For example, the word "payroll" has a high likelihood of corresponding to the human resources domain and a relatively low likelihood of corresponding to the entertainment domain.

Figure 3:
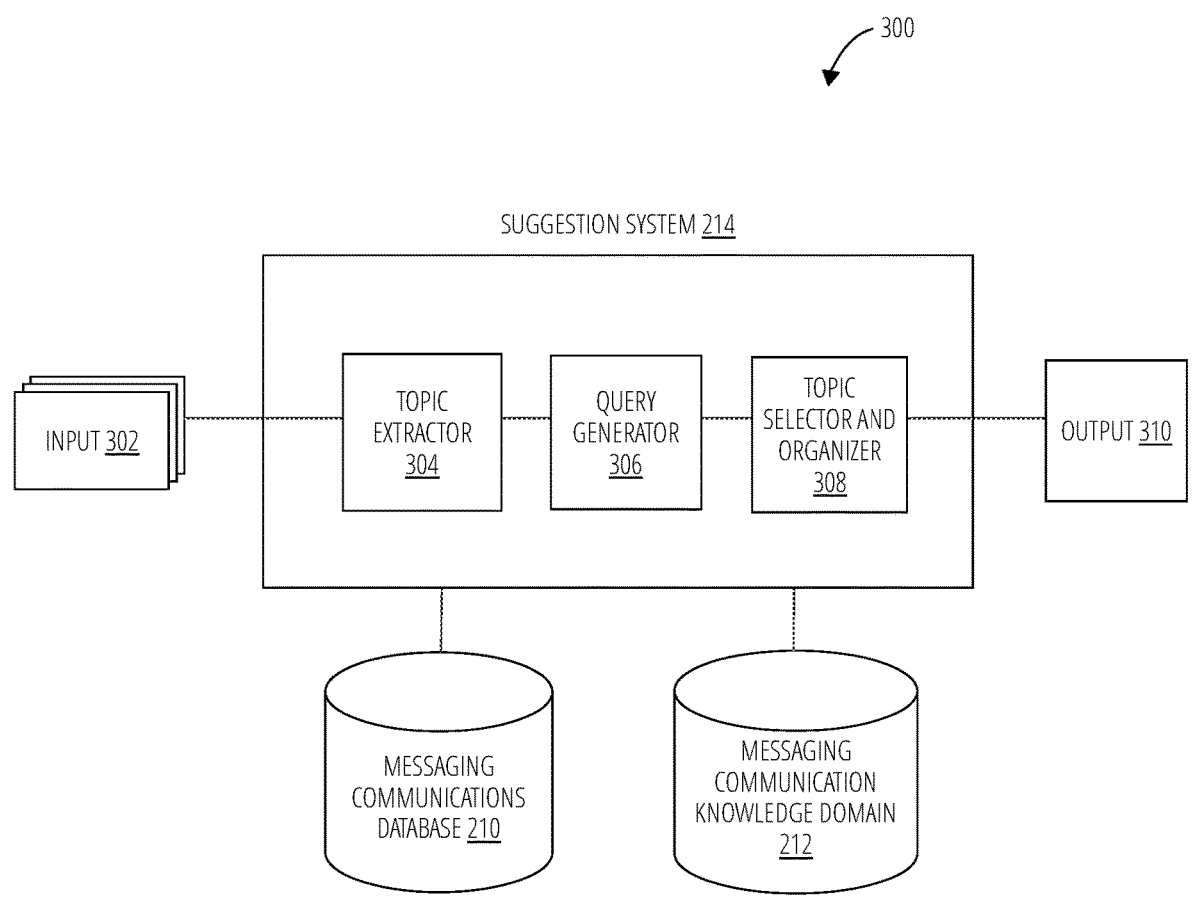
FIG. 3 illustrates an example suggestion system in accordance with some embodiments discussed herein.
Figure 5:
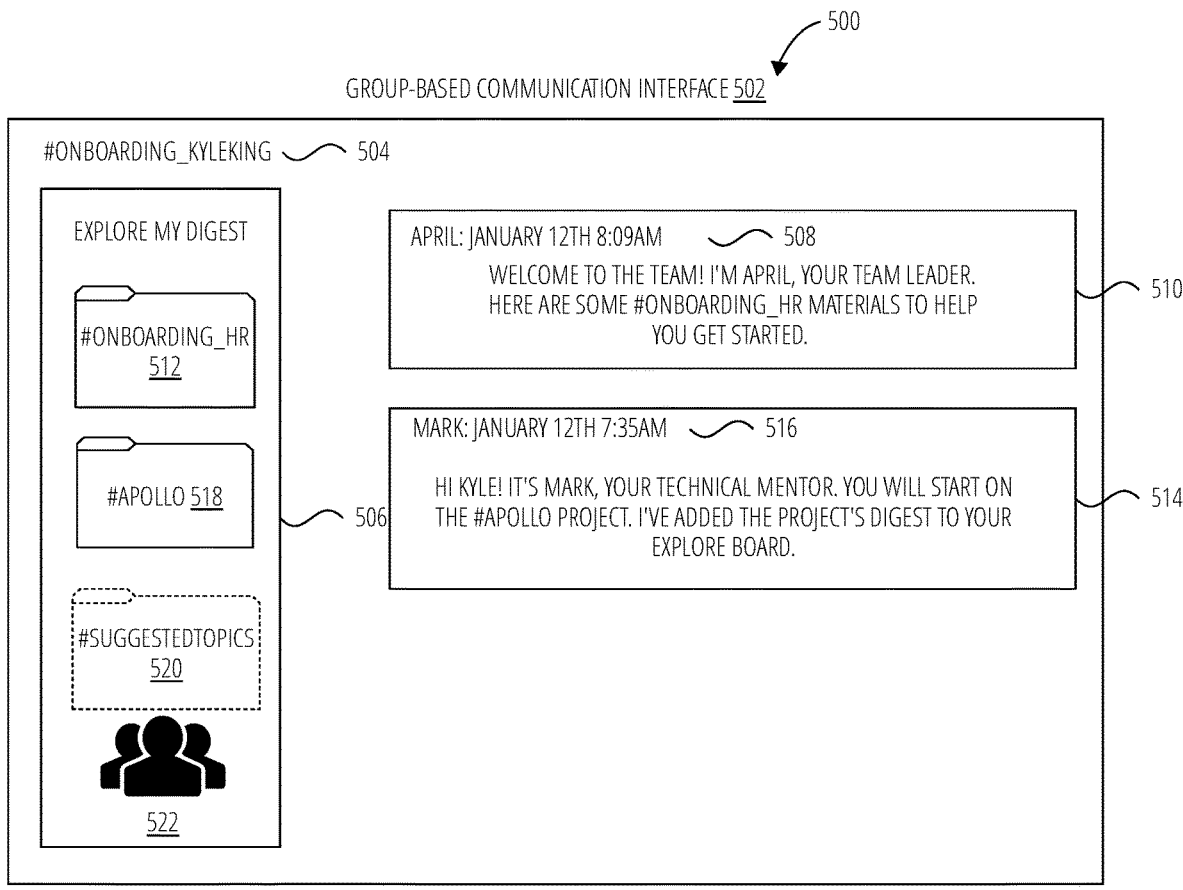
FIG. 5 illustrates an example group-based communication interface in accordance with some embodiments discussed herein.

In some embodiments, with reference to FIG. 3, the suggestion system 214 may include a topic extractor 304, query generator 306, and topic selector and organizer 308, all of which may be in communication with the messaging communications database 210 and/or the messaging communication knowledge domain 212. The suggestion system 214 may receive one or more parameters as input 302 and may generate electronic group-based communication digests in response. The suggestion system 214 may additionally suggest topics, channels, or users of interest in response. In some embodiments, the input 302 may include a direct request from the user to generate an electronic group-based communication digest, while in some embodiments the input 302 may include a request from the system to generate an electronic group-based communication digest. For example, the user may invoke the explore my digest as shown in FIG. 5 window 506 to which the system may automatically generate one or more electronic group-based communication digests. For example, the user may invoke the explore my digest as shown in 506 to which the system may automatically generate group-based communication digests that may be relevant to the user or include important content the user may be interested in. Additionally or alternatively, the system may suggest specific users, group-based channels, or topics for the user to follow. As such, the user may have a sense of awareness of group-based messaging communications occurring around the user that the user might not be otherwise aware of because the user is not a member and/or part of such conversations.

The input 302 may comprise a keyword or text-based search input with other modes of search input. For example, input 302 can include image input or media input (e.g., video, audio, graphic, image, etc.) to which the suggestion system 214 can allow for performance of searches based on text-based, image, and/or media search modes of input into a query. Additionally, when the user or suggestion system 214 initiates a search, other parameters may be used to refine the search results which will be described further below. In yet another example embodiment, the user identifier may be used as input 302. The user identifier as defined above having information related to one or more group-based communication channel identifiers associated with group-based communication channels that the user associated with the user identifier has been granted access to, one or more group identifiers for groups with which the user is associated, a plurality of messages, a plurality of conversations, a plurality of conversation topics, a plurality of group members, to name a few.

The suggestion system 214 can be configured to access said data as well as data corresponding to one or more group-based communication channels, graphical identifiers, user profiles, group profiles, messaging communication knowledge domain data, and channeling associations associated with the user identifier, and generate electronic group-based communication digests as well as recommend one or more topics and/or users to follow in the group-based communication platform. For instance, a group-based communication interface may include information about the suggested topics and particular users who are following the topic. A user who is browsing a topic or is anticipated to have interest in a topic may elect to follow one or more of other users who are also actively engaged in the topic (e.g., posting messages on the topic) and/or the topic itself to which an electronic group-based communication digest is generated for the user by the suggestion system 214. The suggestion system 214 may use any of the algorithms or processes disclosed herein for receiving/capturing data and generating an electronic group-based communication digest in response and suggesting topics or users to follow in response. In some other embodiments, such as when the circuitry 200 is embodied in a group-based communication server 108 and/or client devices 102-106, the suggestion system 214 may be located in another circuitry 200 or another device, such as another group-based communication server 108 and/or client devices 102-106.

With reference to FIG. 3, whether used locally or over a network, the suggestion system 214 may be used to generate one or more electronic group-based communication digests of conceptually related group-based messaging communications. The suggestion system 214 may receive a plurality of input 302 from the circuitry 200 and process the inputs within the suggestion system 214 to produce an output 310, which may include one or more electronic group-based communication digests, suggested topics, suggested channels, and/or suggested users to follow. In some embodiments, the suggestion system 214 may execute the topic extractor 304, create digest search bundles in the query generator 306, execute the topic selector and organizer 308, and output the results via a group-based communication interface. Each of these steps may pull data from a plurality of sources including the messaging communications database 210 and/or the messaging communication knowledge domain 212.

When input 302 is received by the suggestion system 214, topic determination using the topic extractor 304 may first be made. The extracted topics are used to form queries for use in creating the digest search bundles in the query generator 306. The suggestion system 214 may use multiple extraction techniques and can include, but are not limited to: extracting keywords, using machine learning, to match the text query, extracting keywords derived from the user identifier, parsing the attached media for embedded metadata, extracting annotations or commentary associated with the group-based messaging communications and/or group-based communication channels. The input 302 includes a user identifier including user account details (e.g., what user profile is associated with the user identifier) and associated group-based messaging communications transmitted to one or more of a plurality of group-based communication channels. Additionally or alternatively, the input 302 may include a query for at least one of a group-based communication channel, topic, or user identifier. These inputs may give context to the suggestion system 214 to determine the output. For example, the topic extractor 304 may inform the suggestion system 214 as to what messaging communication information to include with the output electronic group-based communication digests and/or which additional topics, channels, and/or users to suggest for following as well as creating electronic group-based communication digests that may be of interest to the user.

The suggestion system 214 may then analyze the extracted topics using to generate digest search bundles via the query generator 306. The query generator 306 draws information about the extracted topics, the one or more parameters included in the input 302, and/or the user identifier and associated group-based messaging communications transmitted to one or more of a plurality of group-based communication channels from the messaging communications database 210 and/or messaging communication knowledge domain 212 and then, generates digest search bundles of the extracted topics to locate conceptually related group-based messaging communications associated with the one or more topics. The suggestion system 214 may then output 310 the conceptually related group-based messaging communications in a digest form with the suggested topic and users to follow.

In some embodiments, the topic selector and organizer 308 may determine that a digest search bundle has already been presented. In such cases, the suggestion system 214 may not output 310 another generated copy of the electronic group-based communication digest, and instead, may output 310 a reference/pointer to the already generated digest. The topic selector and organizer 308 may determine that a digest has already been presented by identifying the topics associated with the selected group-based messaging communication. The topic selector and organizer 308 is further configured to ensure that the electronic group-based communication digest is fresh and not simply a repeat of older, stale messages. For example, the selected conceptually related group-based messaging communications may pertain to a software project, particularly an agile methodology software project. Conceptually related group-based messaging communications may pertain to project release timelines, development phases, events, and so on. These conceptually related group-based messaging communications are collected and culled to pertain to particular topics and distinct temporal characteristics. For example, in the aforementioned agile project, a set of conceptually related group-based messaging communications may represent distinct temporal content in chronological order, ranging from an oldest to a most recent communication messages pertaining to the agile project. The content of the messages is again preferably selected to accurately convey the temporal level to be associated with the topic. For instance, a first (oldest) message may contain content directed to a "planning phase" of the "upcoming development cycle" at a particular date/time. A second message may comment on the expected deliverables, team work capacity, and current project impediments. A third message may describe the outcome of the first development cycle, along with tasks completed, lessons learned, etc. A fourth message may provide a re-cap of the development cycle, along with feedback from the development team, business owners, etc. These are but examples of course, and it will be understood that the temporal classifications may be more coarse or granular depending on the particular domain of interest.

In one embodiment, the topic selector and organizer 308 may determine semantic importance of one or more keywords or text phrases found in each group-based messaging communication associated with the user identifier. The topic selector and organizer may select keywords or phrases that appear most often in the group-based messaging communications as the most semantically important keywords or phrases. For example, "Prince Harry marries Meghan Markle" and similar text phrases may be repeated throughout a plurality of group-based messaging communications, and the topic selector and organizer 308 may determine such a phrase to be an important phrase. Other text analytic techniques may be applied to rank keywords and/or text phrases and determine most important text phrases. In another example embodiment, the important keywords or phrases may be identified based on keywords or phrases associated with the group-based messaging communications the user identifier is already associated with according to messaging communications database 210. In yet another example embodiment, important keywords or phrases may be identified based on other users and or group-based channels considered peripheral to the user identifier, but not directly associated with the user identifier. For example, the user may be a member of a channel and other members of the channel may be engaged in topics that may be relevant to the user. In such case, the topic selector and organizer 308 may further identify new keywords or phrases that may be relevant to the user according to other users considered peripheral to the user (e.g., within a predetermined number of channels that the user is also a member of). Once the important keywords and/or text phrases are identified, conceptually related group-based messaging communications matching the important keywords and/or text phrases may be retrieved from the messaging communications database. As such, the conceptually related group-based messaging communications may be associated with a variety of users and channels and not necessarily a channel where the user is a member.

Examples of content ranking for use with embodiments of the present disclosure are disclosed in U.S. patent application Ser. No. 15/853,376 titled "SYSTEM, APPARATUS, AND COMPUTER PROGRAM PRODUCT FOR GENERATING A GROUP-BASED COMMUNICATION INTERFACE HAVING IMPROVED PANES POSITIONED IN A DEFINED DISPLAY WINDOW," filed Dec. 22, 2017, the contents of which are incorporated herein by reference in their entirety.

Once the set of conceptually related group-based messaging communications are identified, the topic selector and organizer 308 can further filter the set to identify or highlight messages that are considered to be interesting or relevant to the user. In one embodiment, relevancy may be based on the user's own actions. As described above, users may provide responses to group-based messaging communications made by other users via reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, relevant content is based on if other users who are similar to the user engage in a conversation about a particular topic, the particular topic may be relevant to the user. In yet another example implementation, relevant content may be implicitly identified by analyzing user behaviors implying that the user has an interest in a topic associated with the behaviors. For example, the user may follow a topic, a group-based communication channel, or a specific user to which the topic selector and organizer 308 may determine the topic, the channel, or specific user followed as relevant and may further identify new topics or content that may be relevant to the user.

Additionally, the topic selector and organizer 308 is configured for selecting diverse content for inclusion in the digest. For example, the topic selector and organizer 308 may calculate a diversity score indicative of a diversity of the conceptually related group-based messaging communications and select and order the conceptually related group-based messaging communications associated with the one or more concepts based on the diversity score to create a diversified set of conceptually related group-based messaging communications. In said embodiment, the diversity score is calculated based on a minimum threshold number of distinct group-based communication channels and/or distinct users.

The topic selector and organizer 308 may further provide additional filtering parameters associated with the selected conceptually related group-based messaging communications. Additional filtering may be applied after or concurrently with the conceptually related group-based messaging communications retrieval. In some embodiments, content is filtered in response to receipt of a user request for the most recent messages or a diversified set of messages. The topic selector and organizer 308 may further provide an interval of time for selection of the conceptually related group-based messaging communications, such as, for example, 7 days, 2 weeks, or 1 month. For example, retrieve the conceptually related group-based messaging communications within a 2-week timespan. The topic selector and organizer 308 is configured to provide additional filtering parameters preferably comprising adjusting a relevance score assigned to each message, and then selecting the items according to relative scores. In an example embodiment, the relevance score indicates the likely relevance of group-based messaging communications to the user of the client device based on attributes of the group-based messaging communications and user interest indicators retrieved from the user profile data associated with the client device. Selection of messages may be based on the score of an item satisfying a certain threshold, having the highest scores up to a certain number, matching a certain criteria, by removing results that match another criteria or by any suitable selection technique.

The topic selector and organizer 308 may be further configured to access identifier messaging communications database 210 to determine one or more user interest indicators from user profile data. Such user interest indicators may be a user status indicator, a user job indicator, a user interaction indicator, and the like. The topic selector and organizer 308 may score conceptually related group-based messaging communications higher when their contents (e.g., key terms, metadata, file contents, etc.) correspond to a user's status within an organization. For example, Kyle King (see FIG. 5) is a member of the Apollo team project. Thus, the topic selector and organizer 308 may score group-based messaging communications higher that include the terms "apollo" and other related terms. For example, a message stating, "Hi Kyle, you need to be setup with the security credentials relating our latest apollo project enhancement" would be rated or scored higher than a message stating, "Hi Kyle, do you want to meet for lunch today?" In another embodiment, the topic selector and organizer 308 may use the user's job in order to score a message. For example, a message from a user's team leader or supervisor may be rated or scored higher than a message from someone on the same organizational level as the user.

In some embodiments, the topic selector and organizer 308 may make use of one or more machine learning algorithms or statistical models to improve the scoring calculation.

Additionally or alternatively, filtering the content can include sorting the weighted content by time or distance from a highlighted message, or any suitable method of filtering the content may be used. In this context, a highlighted message is a message with a high importance level or the most important. The topic selector and organizer 308 may be configured to calculate an importance level of each concept of the one or more concepts from the group-based messaging communications and select and order the conceptually related group-based messaging communications associated with the one or more concepts based on the calculated importance level. The importance level being calculated based on a recommendation level of the conceptually related group-based messaging communications associated with the one or more concepts that is set by the group-based communication platform and/or a level of anticipated interest associated with the user. Alternatively, filtering the content can include sorting the weighted content by relevance to the query parameters. Alternatively, filtering the content can include selecting content that satisfies the user settings associated with the user identifier. However, any other suitable method of filtering the content can be used.

In an example embodiment, filtering the content includes adjusting the relevance scores of the content based on the distance and/or time. The distance between the message location and the highlighted message (e.g. message within 10 minutes from the highlighted message—more proximal to the highlighted message—is more relevant). Additionally, newer content is preferably scored as more relevant than older content.

In another example embodiment, the content is filtered according to its relationship with the query parameters, such as a search term, group-based communication channel, concept, or user identifier. The relevance between the query parameter and the content message is preferably directly proportional to the relevance score adjustment, wherein the more similar content message is preferably scored as more relevant than less similar content. Alternatively, content messages having high relevance with the query parameters can be selected as conceptually related group-based messaging communications for aggregation into an electronic group-based communication digest, and thereafter the digest and one or more suggested group-based communication channels are transmitted to one or more of client devices 102-106.

In yet another example embodiment, conceptually related group-based messaging communications are filtered by selecting content that satisfies the user settings. Selecting content that satisfies the user settings can include selecting content generated within the time period defined by the time setting (e.g. within a time threshold measured from the receipt time, within a user defined time period) and/or selecting content that satisfies the query parameters (e.g. content that matches or is related to the query parameters). However, any other suitable user setting can be used to select content.

The conceptually related group-based messaging communications are preferably organized into an electronic group-based communication digest, as shown in FIG. 5. Additionally, generated digests may additionally include suggested group-based communication channels for the user to follow.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 202, messaging communications database 210, and/or suggestion system 214 discussed above, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Dynamic UI

Figure 4:
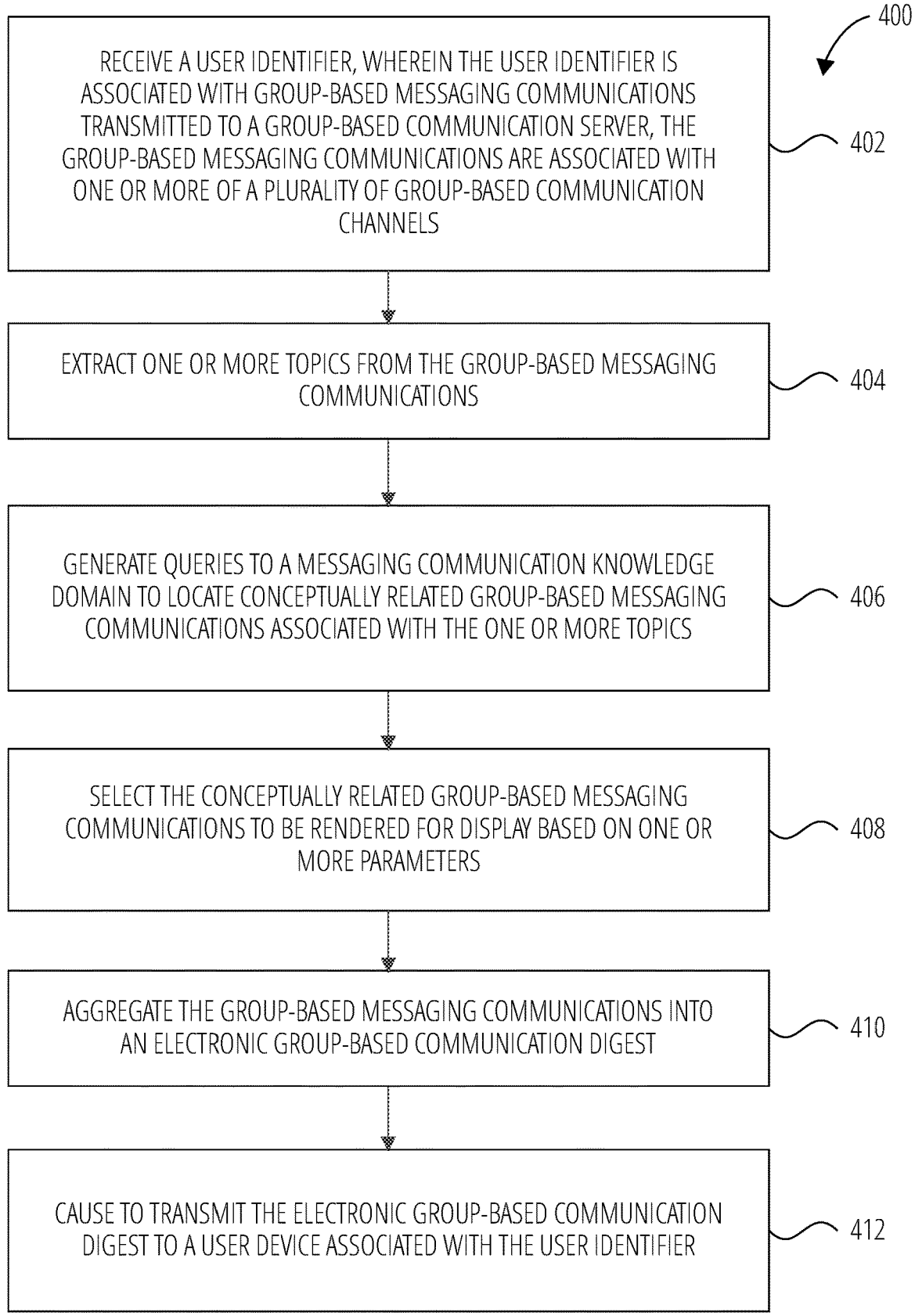
FIG. 4 illustrates a flow diagram of an example system in accordance with some embodiments discussed herein.

FIG. 4 illustrates a flow diagram of an example system in accordance with some embodiments discussed herein. The method 400 illustrated in FIG. 4 includes steps to receive a user identifier, wherein the user identifier is associated with group-based messaging communications transmitted to a group-based communication server, the group-based messaging communications are associated with one or more of a plurality of group-based communication channels 402; extract one or more topics from the group-based messaging communications 404; generate queries to a messaging communication knowledge domain to locate conceptually related group-based messaging communications associated with the one or more topics 406; select the conceptually related group-based messaging communications to be rendered based on one or more parameters 408; and aggregate the group-based messaging communications into an electronic group-based communication digest 410. The method 400 further comprises a step to cause to transmit the electronic group-based communication digest to a user device associated with the user identifier 412. In another example embodiment, the method 400 further comprises causing to transmit in association with the electronic group-based communication digest one or more suggested group-based communication channels to the user device associated with the user identifier.

The group-based communication interface is configured to allow users of the interface to communicate within group-based communication channels and across group-based communication channels to provide relevant information to other users efficiently and effectively. The group-based communication interface is configured to allow a user to move between group-based communication channels. For instance, a user can search for specific group-based communication channels, highlight specific group-based communication channels to receive notifications or updates regarding messaging communications within the group-based communication channel, create specific group-based communication channels, and create group-based communication digests to receive aggregated group-based messaging communications as well as suggested group-based communication channels. For instance, a user can search for a specific group-based communication channel to receive a digest comprising dynamic message notifications or updates regarding messaging communications within the channel. Thus, a digest can be presented or directly accessed by a user without first having to access the desired group-based communication channel.

As indicated at block 402 of FIG. 4, the suggestion system 214 may receive a user identifier, wherein the user identifier is associated with group-based messaging communications transmitted to a group-based communication server, the group-based messaging communications are associated with one or more of a plurality of group-based communication channels. A user identifier, as described above, is associated with a collection of messages that are transmitted to the group-based communications system by a particular user (i.e., a client device associated with the particular user) intended for posting within a group-based communication channel identified by a group-based communication channel identifier associated with the group-based messaging communications. These messages may be analyzed to determine context regarding the user (e.g., the user's expertise or interest in a topic may be determined based on the frequency of mention of the topic or key words associated with the topic within such messages).

In block 404, the suggestion system 214 may extract one or more topics from the group-based messaging communications 404 which functions to determine subject matter that can be of interest to the user. User interests are preferably derived from the retrieved information associated with the user identifier provided for one or more group-based communication channels in association with the user but can also be derived from information received directly from the user. User interests are preferably derived from keywords, topics, images, videos, or any other suitable form of media found in the group-based messaging communications associated with the user identifier.

In block 406, the suggestion system 214 may generate queries to a messaging communication knowledge domain to locate conceptually related group-based messaging communications associated with the one or more topics 406. The queries relate to a particular topic, group-based communication channel, or entity associated with the user identifier and exist within the group-based communications system. The suggestion system 214 may store the generated queries in the messaging communication database 210. In another example embodiment, a meta-index is formed as a compilation of digest search bundles where each bundle stores meta-index data that describes a corresponding base collection of topics.

Accordingly, and as shown in block 408, the suggestion system 214 may select the conceptually related group-based messaging communications to be rendered based on one or more parameters 406 with which the group-based messaging communications are filtered. The user identifier preferably includes a network request time, wherein receiving a user identifier preferably includes receiving the network request time. The user identifier can additionally include a query parameter.

Receiving a user identifier includes determining the network request time, which functions to determine a time with which to filter content. The network request time can be determined by the user device and received by the group-based communication server 108 or can be determined by the group-based communication server 108. The network request time is preferably the time at which the user identifier is received.

Receiving a user identifier can additionally include receiving query parameters. The query parameters preferably function as additional inputs to the filtering of retrieved conceptually related group-based messaging communications. A query parameter can include a time input, a text input, or any other suitable query parameter. A query parameter preferably limits any displayed group-based messaging communication to messages that satisfy or match the query but can alternatively be used directly in computing how relevant the group-based message content is.

In an example embodiment, the suggestion system 214 determines for each message communication in the conceptually related group-based messaging communications set relevance score. In the depicted embodiment, the relevance score indicates the likely relevance of a message communication to the user of the client device based on attributes of the message communication and user interest indicators retrieved from the user profile data associated with the client device. In another embodiment, the relevance score may be further based on attributes of group-based communication channels (i.e., channel topics, channel metadata, channel membership groups, etc.) that correspond to group-based communication channel identifiers.

In an example embodiment, the network request time input can limit the retrieved messages to content generated within the network request input time period. The text input can include a search string, a keyword, or any suitable text input. The text input can additionally be processed to abstract the received text, preferably by using a hierarchical natural language processing/meaning tree, but alternatively by using any other suitable natural language processing technique. The media input preferably includes audio input, image input, and/or video input. The media input is preferably device-generated (e.g. a photo taken by the client device 102) but can alternatively be media from an external source (e.g. a video found on the Internet).

In one embodiment, the suggestion system 214 uses the network request time or retrieves a message communication timestamp for each message communication in the conceptually related group-based messaging communications set. The suggestion system 214 may score message communications higher that have a more recent message communication timestamp and/or within the network request time.

In one embodiment, suggestion system 214 may access messaging communications database 210 to determine one or more user interest indicators from user profile data. Such user interest indicators may be a user status indicator, a user job indicator, a user interaction indicator, and the like. Suggestion system 214 may score message communications higher when their contents (e.g., key terms, metadata, file contents, etc.) correspond to a user's status within an organization. For example, Kyle King (see FIG. 5) is a new employee. Thus, suggestion system 214 may score message communications higher that mention the terms "on-boarding", "new hire", and other related terms. For example, a message communication stating "@channel, does anyone know when the benefits selection will be available for new hires?" would be scored higher than a message communication stating "@channel, does anyone feel like checking out the new food truck for lunch today?"

In another embodiment, suggestion system 214 may use the user's job and the message communication sender's job in order to score a message communication. For example, a message communication from a user's supervisor may be rated higher than a message communication from someone on the same organizational level as the user.

In another embodiment, suggestion system 214 may score message communications higher that appear in group-based communication channels related to a user's status within the organization. For example, if Kyle King's job is software engineer of the Apollo project group in an organization, a message communication in a "Apollo project channel" would be rated higher a message communication in a "work happy hour channel."

In another embodiment, suggestion system 214 may use the user's reaction data and the message communication contents (e.g., key terms, metadata, file contents, etc.) in order to score the message communication and set the user interaction indicator. For example, Kyle King may frequently interact (e.g. link click, reaction, reply, etc) with messages related to the project Apollo. Each time Kyle King interacts with a message communication, the suggestion system 214, indicated this action (e.g., as a reaction event log, etc.) to which the suggestion system 214 may then store, in the user's profile, a user interaction indicator that indicates Kyle King's interaction history for a particular topic. Based on these user interaction indicators the suggestion system 214 may determine message communications, topics, users, or group-based communication channels, and the like that are relevant or of particular interest to a user.

In some embodiments, the suggestion system 214 may only consider messages above a particular threshold score for inclusion in the electronic group-based communication digest.

In one embodiment, the suggestion system 214 may also use a diversity filter or a diversity heuristic to ensure that message communications from a plurality of group-based communication channels and users are retrieved.

Considering the above information, the suggestion system 214 may automatically rank lower and/or remove similar message communications that have similar characteristics (e.g. same author, same channel, same link, same file, etc.). This scoring criteria may be combined with any others discussed above to determine a relevance score.

In example embodiments, the suggestion system 214 may include a variety of modules to analyze the message communication contents. In one implementation, such modules may include a work graph generating process (e.g., to generate work graphs (e.g., machine learning structured input data such as a channel's priority for a user)), a machine learning process (e.g., to generate other machine learning structure input data (e.g., team-level term priority), to generate machine learning structures (e.g., team-level neural networks)), and/or the like. For example, the suggestion system 214 may utilize tools such as Apache Hive®, Presto®, Apache Spark®, Apache Solr® node, and/or the like to facilitate analyzing unstructured or structured data from the message communications.

Considering the above information, relationships between user to user, user to channel, user to topic, and the like may be represented in a work graph which may be surfaced to the suggestion system 214. The suggestion system 214 may query the content of the message communication according to a variety of queries related to how close the user and the channel are in the work graph, whether the messages contains a link or file, the number of words, lines, and paragraphs in the message and the like. For example, queries such as "popular with user's channel members," "viewed by the user," "most viewed by the user," and the like.

Accordingly, as shown in block 410, the suggestion system 214 may aggregate the group-based messaging communications into an electronic group-based communication digest 410. The selected and filtered conceptually related group-based messaging communications may be combined or aggregated to produce an electronic group-based communication digest. The electronic group-based communication digest comprising a summary of the conceptually related group-based messaging communications from one or more group-based communication channels. These conceptually related group-based messaging communications included within the electronic group-based communication digest may be ranked according to their corresponding relevance scores. In another example embodiment, the highest-ranking message may be displayed with a predetermined number of messages that immediately chronologically precede and immediately chronologically follow said highest ranking message within the group-based communication channels in which the highest-ranking message is associated with. In yet another example embodiment, said surrounding messages may be included based on their relevancy score.

In one embodiment, each message is displayed with the author's name, the timestamp of when the message was transmitted, and a summary of the number of emoji-based reactions and text-based replies the message received. Additionally, each message may further include the title of the group-based communication channel such that when a user selects a message such as clicking on the message within the group-based communication interface, the group-based communication interface may cause to render for display the message within the channel in which the message originally appeared.

In one embodiment, each electronic group-based communication digest may provide further information such as author(s) names, group-based channel title(s), timestamp of the latest message, and a summary of the number of emoji-based reactions and text-based replies the electronic group-based communication digest received.

In one embodiment, the suggestion system 214 may cause to transmit the electronic group-based communication digest to a user device associated with the user identifier 412. The digest is transmitted to the user's client device when the digest is to be presented for display on the user's computing device via the group-based communication interface 502 as shown in FIG. 5. Additionally, the suggestion system 214 may cause to transmit in association with the electronic group-based communication digest one or more suggested group-based communication channels to the user device associated with the user identifier. This example embodiment is illustrated in FIG. 5, explore my digest 506 section comprising one or more generated digests 512 and 518, suggested topics 520, and suggested group-based communication channels to follow.

FIG. 5 illustrates an example group-based communication interface 502 structured in accordance with various embodiments of the invention. The channel 504 includes messaging communication information 510 and 514. The messaging communication information 510 and 514 includes a user identifier, and the time and date of receipt of the respective group-based messaging communication as shown as items 508 and 516. The group-based communication interface 502 also shows the name of the channel 504 and may include other identifying information for the channel 504 not shown (e.g., date of creation, time of last messaging communication, users of communication channel, etc.).

In the embodiment illustrated in FIG. 5, the channel 504 shows the hashtag keyword/topic associated with the channel. Additionally or alternatively, a graphical identifier associated with the channel may be shown as any suitable image or visual object including animated object. In the embodiment illustrated in FIG. 5, the group-based communication interface 502 received a channeling association associating the channel 504 ("#onboarding_kyleking").

As noted above, the channel 504 of FIG. 5 includes messaging communication information 510 and 514. In the embodiment illustrated in FIG. 5, the names of the selected group-based communication channels in which the respective group-based messaging communications were first received are included in the messaging communication information 510 and 514. The channel 504 further includes an explore my digest 506 section comprising one or more generated digests 512 and 518, suggested topics 520, and suggested group-based communication channels to follow. A user may select each item within the explore my digest 506, thereby initiating a request to the circuitry 200 for processing. The circuitry 200 may then initiate the generation and display of the selected digest, or suggested topics for channels on the group-based communication interface.

For instance, the digest #onboarding_HR 512 may be selected, initiating a digest request configured to view the group-based communication digest "onboarding_hr." The group-based communication interface may then display the onboarding_hr digest. The suggested group-based communication channels 522 may instead be selected, initiating a request configured to view the one or more suggested group-based communication channels to follow and/or explore.

In some example embodiments, the group-based communication interface 502 may further provide, although not shown, levers, knobs, buttons, etc. arranged in one or more standard configurations to provide control of adjustable filtering parameters such as selection for the most recent messages, messages within a specific timespan, or a diversified set of messages.

Figure 6:
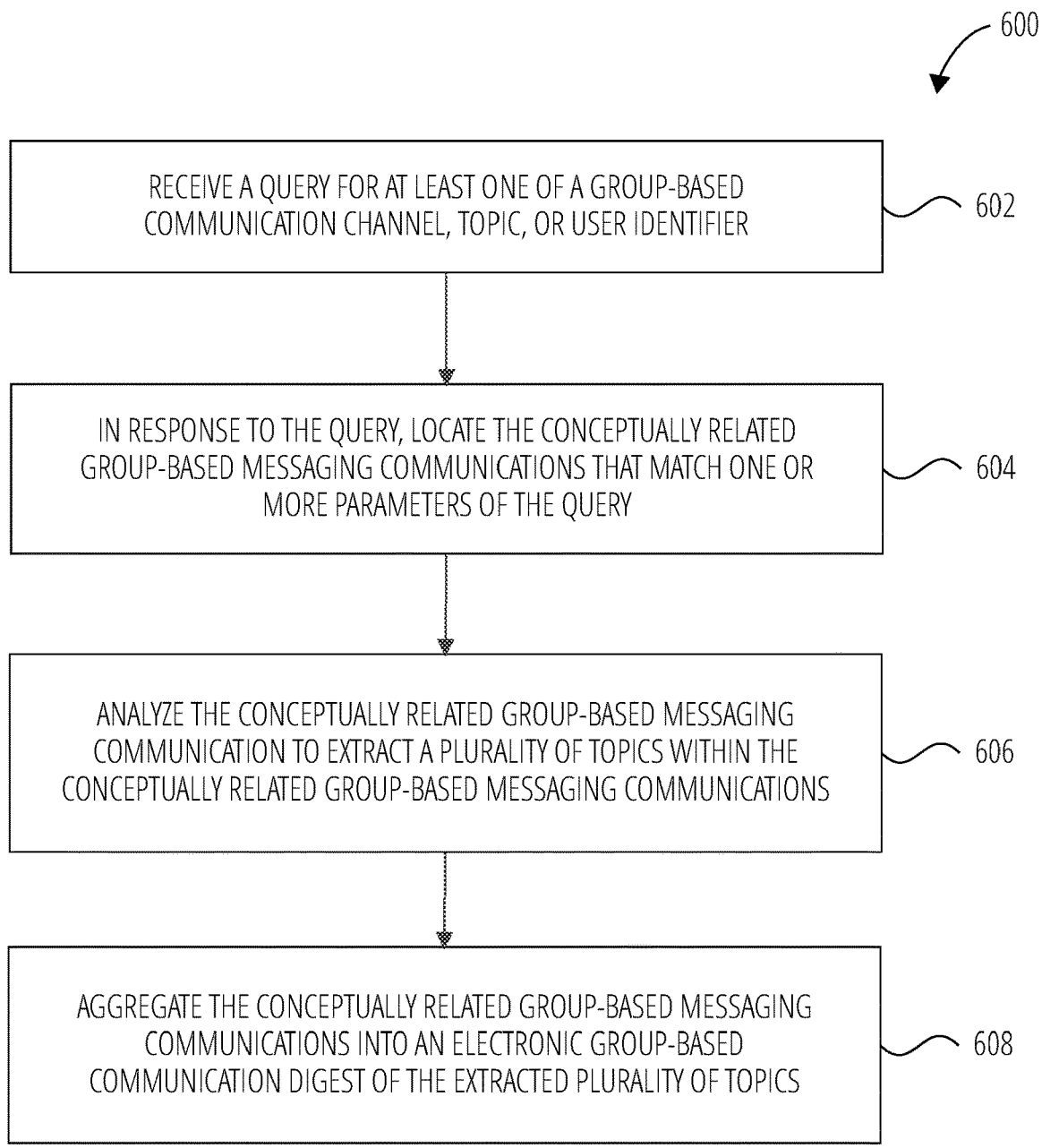
FIG. 6 illustrates a flow diagram of an example system in accordance with some embodiments discussed herein.

FIG. 6 illustrates a flow diagram of an example system in accordance with some embodiments discussed herein. In particular, FIG. 6 illustrates a method to receive a query for at least one of a group-based communication channel, topic, or user identifier 602. The method further includes process steps for in response to the query, locate the conceptually related group-based messaging communications that match one or more parameters of the query 604; analyze the conceptually related group-based messaging communication to extract a plurality of topics within the conceptually related group-based messaging communications 606; and aggregate the conceptually related group-based messaging communications into an electronic group-based communication digest of the extracted plurality of topics 608. The method 600 may also include displaying the electronic group-based communication digest via the group-based communication interface 502.

As indicated at block 602 of FIG. 6, the suggestion system 214 may be configured to receive a query for at least one of a group-based communication channel, topic, or user identifier 602. In some embodiments, the system 100 may be configured to segment the query into keywords/topics. As part of the segmenting process, the suggestion system 214 may normalize the text of the query, performing operations such as stemming or removing words that do not provide information (e.g., "the," "a," or the like).

Thereafter, the suggest suggestion system 214 may in response to the query, locate the conceptually related group-based messaging communications that match one or more parameters of the query 604. The suggestion system 214 may locate the conceptually related group-based messaging communications from messaging communications stored in the messaging communications database 210 and/or the messaging communication knowledge domain 212 that match or are associated with the keywords and parameters identified in the query.

The suggestion system 214 may then analyze the conceptually related group-based messaging communication to extract a plurality of topics within the conceptually related group-based messaging communications 606 and aggregate the conceptually related group-based messaging communications into an electronic group-based communication digest of the extracted plurality of topics 608.

As an example, when a user inputs a search query of "Mark Zuckerberg" into a query input, the suggestion system 214 may provide and extract topics such as "information privacy," as well as extract conceptually related topics, such as "Facebook." In the group-based communication interface 502, a digest is generated which includes communication message results related to the topics of "Mark Zuckerberg," "Facebook," and "information privacy," from a plurality of group-based communication channels without first accessing the plurality of group-based communication channels which have been determined in accordance with the techniques described herein.

Additionally or alternatively, the suggestion system 214 may make a recommendation of any topic or group-based communication channel to the user. For example, the suggestion system 214 can make a recommendation of a channel to user based on similarities between the content in the messaging communications associated with the user. The suggestion system 214 can make multiple suggestions as well as rank or order the suggestions in terms of their relevance to the user associated with the user identifier.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:

at least one processor, and at least one memory including computer program code for one or more programs, the at least one memory and the computer program code configured to, with the at least one processor, cause the apparatus to perform at least the following:

receive a user identifier, wherein the user identifier is associated with group-based messaging communications transmitted to a group-based communication server, the group-based messaging communications are associated with one or more of a plurality of group-based communication channels;

generate queries to a messaging communication knowledge domain to locate conceptually related group-based messaging communications associated with the one or more topics extracted from the group-based messaging communications;

select the conceptually related group-based messaging communications to be rendered for display based on one or more parameters;

aggregate the group-based messaging communications into an electronic group-based communication digest; and cause to transmit the electronic group-based communication digest to a user device associated with the user identifier.

2. The apparatus of claim 1, wherein the at least one memory and the computer program code are further configured to, with the at least one processor, cause the apparatus to perform at least the following:

cause to transmit, in association with the electronic group-based communication digest, one or more suggested group-based communication channels to the user device associated with the user identifier.

3. The apparatus of claim 1, wherein the one or more parameters specify conceptually related group-based messaging communications having associated therewith timestamps occurring before a predetermined network time.

4. The apparatus of claim 1, wherein the at least one memory and the computer program code are further configured to, with the at least one processor, cause the apparatus to perform at least the following:
calculate an importance level of each concept of the one or more topics from the group-based messaging communications; and
select and order the conceptually related group-based messaging communications associated with the one or more topics based on the calculated importance level.

5. The apparatus of claim 4, wherein the importance level is calculated based on a recommendation level of the conceptually related group-based messaging communications associated with the one or more topics that is set by a group-based communication platform and/or a level of anticipated interest associated with the user identifier.

6. The apparatus of claim 1, wherein the at least one memory and the computer program code are further configured to, with the at least one processor, cause the apparatus to perform at least the following:
calculate a diversity score indicative of a diversity of the conceptually related group-based messaging communications; and
select and order the conceptually related group-based messaging communications associated with the one or more topics based on the diversity score to create a diversified set of conceptually related group-based messaging communications.

7. The apparatus of claim 6, wherein the diversity score is calculated based on a minimum threshold number of distinct group-based communication channels.

8. The apparatus of claim 1, wherein the at least one memory and the computer program code are further configured to, with the at least one processor, cause the apparatus to perform at least the following:
receive a query for at least one of a group-based communication channel, topic, or the user identifier;
in response to the query, locate the conceptually related group-based messaging communications that match one or more parameters of the query;
analyze the conceptually related group-based messaging communication to extract a plurality of topics within the conceptually related group-based messaging communications; and
aggregate the conceptually related group-based messaging communications into the electronic group-based communication digest of the extracted plurality of topics.

9. A computer-implemented method comprising:
receiving a user identifier, wherein the user identifier is associated with group-based messaging communications transmitted to a group-based communication server, the group-based messaging communications are associated with one or more of a plurality of group-based communication channels;
extracting one or more topics from the group-based messaging communications;
generating queries to a messaging communication knowledge domain to locate conceptually related group-based messaging communications associated with the one or more topics;
selecting the conceptually related group-based messaging communications to be rendered for display based on one or more parameters;
aggregating the group-based messaging communications into an electronic group-based communication digest; and
causing to transmit the electronic group-based communication digest to a user device associated with the user identifier.

10. The method of claim 9, further comprising:
causing to transmit, in association with the electronic group-based communication digest, one or more suggested group-based communication channels to the user device associated with the user identifier.

11. The method of claim 9, wherein the one or more parameters specify conceptually related group-based messaging communications having associated therewith timestamps occurring before a predetermined network time.

12. The method of claim 9, further comprising:
calculating an importance level of each concept of the one or more topics from the group-based messaging communications; and
selecting and order the conceptually related group-based messaging communications associated with the one or more topics based on the calculated importance level.

13. The method of claim 12, wherein the importance level is calculated based on a recommendation level of the conceptually related group-based messaging communications associated with the one or more topics that is set by a group-based communication platform and/or a level of anticipated interest associated with the user identifier.

14. The method of claim 9, further comprising:
calculating a diversity score indicative of a diversity of the conceptually related group-based messaging communications; and
selecting and order the conceptually related group-based messaging communications associated with the one or more topics based on the diversity score to create a diversified set of the conceptually related group-based messaging communications.

15. The method of claim 14, wherein the diversity score is calculated based on a minimum threshold number of distinct group-based communication channels.

16. The method of claim 9, further comprising:
receiving a query for at least one of a group-based communication channel, topic, or the user identifier;
in response to the query, locating the conceptually related group-based messaging communications that match one or more parameters of the query;
analyzing the conceptually related group-based messaging communication to extract a plurality of topics within the conceptually related group-based messaging communications; and
aggregating the conceptually related group-based messaging communications into the electronic group-based communication digest of the extracted plurality of topics.

17. A computer program product comprising at least one computer readable non-transitory memory medium having program code instructions stored thereon, the program code instructions which when executed by an apparatus causes the apparatus at least to:
receive a user identifier, wherein the user identifier is associated with group-based messaging communications transmitted to a group-based communication server, the group-based messaging communications are associated with one or more of a plurality of group-based communication channels;
extract one or more topics from the group-based messaging communications;

generate queries to a messaging communication knowledge domain to locate conceptually related group-based messaging communications associated with the one or more topics;

select the conceptually related group-based messaging communications to be rendered for display based on one or more parameters;

aggregate the group-based messaging communications into an electronic group-based communication digest; and cause to transmit the electronic group-based communication digest to a user device associated with the user identifier.

18. The apparatus of claim 17, wherein the non-transitory memory medium having program code instructions stored thereon, the program code instructions which when executed by the apparatus further causes the apparatus at least to:

cause to transmit, in association with the electronic group-based communication digest, one or more suggested group-based communication channels to the user device associated with the user identifier.

19. The computer program product of claim 17, wherein the one or more parameters specify conceptually related group-based messaging communications having associated therewith timestamps occurring before a predetermined network time.

20. The computer program product of claim 17 wherein the non-transitory memory medium having program code instructions stored thereon, the program code instructions which when executed by the apparatus further causes the apparatus at least to:

calculate an importance level of each concept of the one or more topics from the group-based messaging communications; and select and order the conceptually related group-based messaging communications associated with the one or more topics based on the calculated importance level.

21. The computer program product of claim 20, wherein the importance level is calculated based on a recommendation level of the conceptually related group-based messaging communications associated with the one or more topics that is set by a group-based communication platform and/or a level of anticipated interest associated with the user identifier.

22. The computer program product of claim 17, wherein the non-transitory memory medium having program code instructions stored thereon, the program code instructions which when executed by the apparatus further causes the apparatus at least to:

calculate a diversity score indicative of a diversity of the conceptually related group-based messaging communications; and select and order the conceptually related group-based messaging communications associated with the one or more topics based on the diversity score to create a diversified set of conceptually related group-based messaging communications.

23. The computer program product of claim 22, wherein the diversity score is calculated based on a minimum threshold number of distinct group-based communication channels.

* * * * *

UNITED STATES PATENT AND TRADEMARK OFFICE
CERTIFICATE OF CORRECTION

PATENT NO. : 10,805,386 B2
APPLICATION NO. : 16/514821
DATED : October 13, 2020
INVENTOR(S) : Renaud Bourassa-Denis et al.

It is certified that error appears in the above-identified patent and that said Letters Patent is hereby corrected as shown below:

In the Claims

Column 32, Line 42, change "with the" to --with--.

Signed and Sealed this
Tenth Day of November, 2020

Andrei Iancu
*Director of the United States Patent and Trademark Office*